3,331,689
PROCESS OF PRODUCING AZO COMPOUNDS BY HEATING DIAZO COMPOSITIONS COMPRISING PRECURSORY COUPLERS ACTIVABLE BY HEAT
George Sosnovsky and John W. Garner, Chicago, and Donald E. Laskowski, Elmhurst, Ill., assignors, by mesne assignments, to The Frederick Post Co., Chicago, Ill., a corporation of Illinois
No Drawing. Filed July 18, 1963, Ser. No. 296,112
14 Claims. (Cl. 96—49)

The present invention relates generally to the production of azo compounds and to a new mechanism for effecting a union between a diazonium compound and material to couple therewith. It has particular reference to producing azo dyes.

Heretofore, such dyes have been produced by combining a coupling agent with a diazonium compound under conditions to effect the desired reaction. A coupling agent is an organic compound having an active hydrogen atom. The commonly used ones are aromatic compounds having an hydroxyl or an amino or a carbonyl substituent in a position to activate a hydrogen atom.

The present invention is based upon the initial discovery that a certain ring-substituted benzoic acid which has no hydroxyl or amine or carbonyl substituent in the ring and which does not couple, can be so used as to effect a coupling reaction. The discovery has led to use of organic compounds which have one or more of carboxylic acid groups of which at least one is subject to decarboxylation when heated, thereby losing $CO_2$ and replacing said —COOH group with the residual hydrogen atom. We have found that some of these compounds which are incapable of coupling before decarboxylation, are also incapable of coupling after decarboxylation to form azo compounds. In addition to decarboxylatable compounds which do not couple at all with diazo compounds when processed by the usual ammonia gas or alkaline or non-alkaline developer solutions, there are others which are capable of coupling when subjected to the foregoing conditions. It was a surprising discovery that such non-coupling compounds effect a coupling when decarboxylation takes place in the presence of a diazo compound, and also that such coupling compounds effect stronger coupling reactions by the decarboxylation mechanism in the presence of a diazo compound. Because of these discoveries, such decarboxylatable compounds are herein designated as "coupler precursors." It is possible that decarboxylation yields a transitory material which may be a free radical capable of coupling with a diazonium compound, but we are not committed to any particular theory.

According to the present invention, these coupler precursors are made to produce coupling residues by effecting the decarboxylation in the presence of a diazonium salt. Not all diazonium salts may be used. Diazonium compounds are also sensitive to heat, and above some critical temperature, each one decomposes with loss of the two nitrogen atoms of the diazo group —N=N—. Only those diazonium salts may be used which exist as such during the decarboxylation.

One family of these coupler precursors includes both di- and tri- ring-substituted benzoic acids. The invention was first accomplished with a stable combination of 2,4,6-trinitrobenzoic acid and p-diethylamino-diazobenzene chloride. These ingredients do not couple. However, by heating such a dry combination on a carrier at 150° C. decarboxylation promptly takes place and coupling is effected. The temperature of 150° C. is not a critical one. At lower temperatures, the color formation takes place more slowly. The hydrogen atom of the carboxylic acid group combines with the chlorine atom of the —N=N—Cl group rather than said hydrogen atom joins with a transitory material resulting from decarboxylation, which material, we believe, couples at the position opened by the decarboxylation.

The generic reaction can take place not only in a liquid medium and in solutions but also in a substantially dry solid mixture in which the essential ingredients are in suitable close association for intimate contact at the time of decarboxylation. Thus, a sheet of paper, or cloth, or film, or the surface of any carrier, coated or impregnated with the above-described mixture may be heated, for example, to 150° C. to produce a dyestuff which is blue. Such a coated paper may be used for producing diazotype prints when the diazonium compound thereof is light-sensitive. In such use, the coated face of the paper is exposed to ultraviolet light under a masking medium, or transparency, such as a tracing. Only the diazonium compound is decomposed by the actinic light, so that no color is formed on heating where the diazonium compound has been decomposed, and color is formed during decarboxylation where the coat is protected from the actinic light.

In view of the discoveries disclosed above, it is the general object of the invention to produce azo compounds merely by heating a suitable reactive combination containing a diazo compound and the coupling precursor.

It is a particular object of the invention to produce an azo dye by effecting such reaction on a carrier, such as paper, or cloth, or film, by heating the carrier having the reactive mixture.

It is another object of the invention to use a light-sensitive diazo compound in such a reactive mixture on a carrier, thereby to produce a light-sensitive product which can be developed by heat after exposure, to a dyed pattern on the carrier.

It is a particular object of the invention to produce light-sensitive thermally developable diazotypes.

The invention is further explained and illustrated hereinafter by its use in the diazotype field, and by its use to produce an isolated azo dyestuff. From these illustrations various other applications will readily appear to those skilled in the art, without departing from the invention set forth in the appended claims.

Where the generic reaction is effected in a liquid medium, the reaction may be carried out in a pressure vessel if the temperature of decarboxylation is not reached at atmospheric pressure.

The reaction is illustrated as follows:

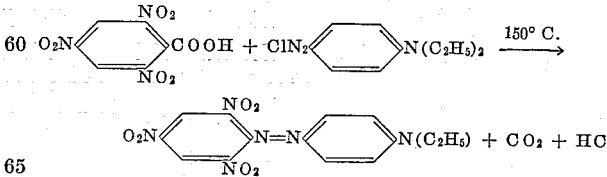

The identity of the product of the above reaction has been verified in a conventional way by reversing the roles of the aromatic rings as follows:

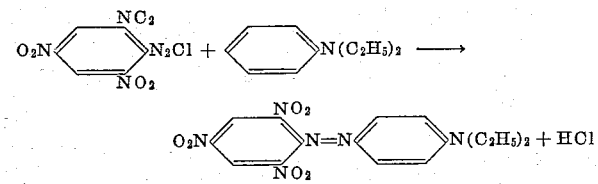

The dyes formed by the two reactions given above have been found to be spectrographically identical, thus verifying the new reaction as shown and described, and at least in this instance indicating that coupling takes place at the position of the lost —COOH group.

The following example shows one manner of carrying out the invention for use as a thermally developable diazotype.

EXAMPLE 1

A solution is prepared containing 64 mg. of 2,4,6-trinitrobenzoic acid (I) in 32 ml. of acetone. A carrier sheet of paper is coated with the solution and then dried to provide 0.172 mg. of the solute per square inch. Thereafter, a 1% solution is prepared in water of p-diazo-diethylaniline chloride-zinc chloride double salt. This solution is suitably coated onto the dried sheet and then dried to provide 0.15 mg. per square inch of the diazonium salt which includes the $ZnCl_2$ weight. The dried sheet was exposed through a patterned transparency to ultraviolet light until the diazo compound in the areas not covered by the pattern was photochemically decomposed. Then, the exposed sheet was heated in a platen press for 10 seconds at 150° C. reproducing the pattern in a blue color.

The following example shows the manner of carrying out the reaction in a liquid medium and of isolating the dye.

EXAMPLE 2

The zinc chloride double salt of p-diazo-diethylaniline chloride in the amount of 0.694 gm. and 2,4,6-trinitrobenzoic acid (I) in the amount of 0.514 gm. are dissolved in purified dioxane (25 ml.) and heated under reflux for 30 minutes. The densely colored reaction mixture is then diluted to 150 ml. with water and the insoluble dye is filtered, dried and dissolved in the least amount of acetone (5–10 ml.). The acetone solution is chromatographed on a column of silica gel (150–200 gm.) which has been slurry-packed with n-hexane. Eluants were used: first 100% n-hexane, then a 50% solution of n-hexane-ethyl ether and finally 100% ethyl ether until the dye emerges from the column. A center portion of the emerging dye band is collected to avoid contaminants due to possible overlapping of the dye band with reaction by-products in adjacent bands.

Thus, on evaporation of the elution solvent purified azo dye product is obtained as dark yellow-green crystals melting at 203–206° C. (uncorrected).

The invention using 2,4,6-trinitrobenzoic acid is not limited to using the illustrative diazonium compounds p-diazo-diethylaniline chloride zinc chloride double salt. The following table of examples gives the colors produced with other diazonium compounds, when carried out by substituting the listed diazonium compounds in Example 1.

TABLE I.—HEAT DEVELOPED COLORS USING 2,4,6-TRINITROBENZOIC ACID WITH ZINC CHLORIDE DOUBLE SALTS OF VARIOUS DIAZO COMPOUNDS

| Ex. | Diazonium chloride-zinc chloride of diazo compound | Heat Developed Color |
|---|---|---|
| 3 | p-Diazo-2,5-diethoxy-4-tolylmercaptobenzene | Red. |
| 4 | p-Diazo-3-methoxy-4-methylbenzylaniline | Blue. |
| 5 | p-Diazo-2,5-dibutoxy-4-benzoylaminobenzene | Red. |
| 6 | p-Diazo-4-ethylbenzylaniline | Purple blue. |
| 7 | p-Diazo-3-chloro-4-diethylaniline | Red brown. |
| 8 | p-Diazo-2,5,4'-triethoxydiphenyl | Red. |
| 9 | p-Diazo-diethylaniline | Blue. |

The invention is not limited to 2,4,6-trinitrobenzoic acid. The following Table II shows other derivatives of benzoic acid coupled with the zinc chloride double salts of different diazonium chlorides. For Table II, the procedure used for the production of azo dyes is the same as that in Example 1, with these differences: The temperatures for and the degrees of decarboxylation vary with the coupler precursor used, calling for a higher concentration of the precursor to produce suitable color densities for diazotypes. The usages of the precursor of Table II are from 2 to 3 mg. per square inch of coating, except in the case of 2,4,6-trinitrobenzoic acid for which the usage is given in Example 1.

In Table II the diazo compound is designated by a number, detailed in the footnote, it being noted that the p-diazo-diethylaniline of Example 1 is diazo No. 1.

TABLE II

| Ex. | Coupler Precursor | Precursor No. | Diazo Compound [1] | Color | T., °C. |
|---|---|---|---|---|---|
| 10 | 2,4,6-trinitrobenzoic acid | I | No. 2 | Red | 150 |
| 11 | 2,4,6-tris-3,5-dinitrobenzoyloxybenzoic acid | II | No. 3 | Brown | 190 |
| 12 | 2,6-di-3,5-dinitrobenzoyloxybenzoic acid | III | No. 3 | do | 190 |
| 13 | 2,4,6-tris-trichloroacetoxybenzoic acid | IV | No. 4 | Red-brown | 190 |
| 14 | 2,6-di-trichloroacetoxybenzoic acid | V | No. 2 | Red | 190 |
| 15 | 2,6-di-trifluoroacetoxybenzoic acid | VI | No. 2 | do | 190 |
| 16 | 2,4,6-trichlorobenzoic acid | VII | No. 2 | Brown | 150 |
| 17 | 2,3,6-trichlorobenzoic acid | VIII | No. 3 | Blue-green | 150 |
| 18 | 2,4,5-trichlorobenzoic acid | IX | No. 3 | do | 150 |
| 19 | 2,6-dichloro-nitrobenzoic acid | X | No. 3 | Blue-gray | 170 |
| 20 | do | X | No. 5 | do | 170 |
| 21 | 2,4-dichloro-nitrobenzoic acid | XI | No. 3 | Blue | 150 |
| 22 | do | XI | No. 5 | do | 150 |
| 23 | 2-bromo-nitrobenzoic acid | XII | No. 2 | Blue-green | 150 |
| 24 | do | XII | No. 3 | do | 150 |
| 25 | do | XII | No. 5 | do | 150 |

[1] Diazo Compounds:
No. 2—p-Diazo-2,5-diethoxy-4-tolylmercaptobenzene.
No. 3—p-Diazo-4-ethylbenzylaniline.
No. 4—p-Diazo-3-chloro-4-diethylaniline.
No. 5—p-Diazo-2,5-dibutoxy-4-benzoylaminobenzene.

The coupler precursors listed in Table II are derivatives of benzoic acid, with two or three substituents in known positions as shown in Table III with their melting points. Where the position is questionable, it is designated by $x$. For reference to Table III, the positions on the benzene ring of benzoic acid are as follows:

TABLE III

| Precursor No. | Positions | Substituents | Name | M.P., °C. |
|---|---|---|---|---|
| I | 2,4,6 | —NO₂ | See Table II | (¹) |
| II | 2,4,6 | —O—CO— 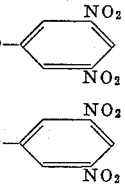 | ____do____ | 205–206 |
| III | 2,6 | —O—CO—  | ____do____ | 201–203 |
| IV | 2,4,6 | —O—CO—CCl₃ | ____do____ | 179–183 |
| V | 2,6 | —O—CO—CCl₃ | ____do____ | 126–129 |
| VI | 2,6 | —O—CO—CF₃ | ____do____ | 173–178 |
| VII | 2,4,6 | —Cl | ____do____ | 161–163 |
| VIII | 2,3,6 | —Cl | ____do____ | 163–164.5 |
| IX | 2,4,5 | —Cl | ____do____ | 163–164 |
| X | 2,6 / x | —Cl / —NO₂ | ____do____ | 188–190 |
| XI | 2,4 / x | —Cl / —NO₂ | ____do____ | 159–160 |
| XII | 2 / x | —Br / —NO₂ | ____do____ | 15 –152 |

¹ Decompose at 210°.

Some of the precursors listed have been specially prepared as follows:

*Preparation No. 1 of 2,4,6-tris-3,5-dinitrobenzoyloxy-benzoic acid (II).*—A 6 gm. quantity of commercial grade 3,5-dinitrobenzoyl chloride was dissolved in anhydrous pyridine (300 ml.) in a 500-ml. round-bottom flask. The flask was fitted with a thermometer, a magnetic stirrer, and a reflux condenser with drying tube. 17 gm. of 2,4,6-trihydroxybenzoic acid was added to the solution in small portions. The temperature was kept below 30° C. in a cooling bath during the addition of the benzoic acid.

After the addition of the acid was completed the temperature of the reaction mixture was raised to 50° to 60° C. The reaction mixture was maintained at this temperature for 24 hours. The thick brown reaction mixture was poured into an evaporating dish, and the excess of pyridine was allowed to evaporate at room temperature. The heavy brown-yellow residue was slurried with 6-N hydrochloric acid. Then, the mixture was diluted to two liters with water. The solids were filtered, washed free of mineral acid with water and air dried, yielding 49 gm. of crude 2,4,6-tris-3,5-dinitrobenzoyloxybenzoic acid. This was dissolved by repeated extraction with fresh mixtures of benzene-acetone (4 to 1).

The solution was chromatographed on a silica gel column. The column was packed with a slurry of silica gel (1200 gm.) and n-hexane. The eluant was used: first, 100% benzene, then a 50% mixture of benzene-acetone, and finally, 100% methanol. On exaporation of the solvent in air the 2,4,6,-3,5-dinitrobenzoyloxybenzoic acid was recovered as pale yellow crystals (38.5 gm.) M.P. 205° to 206° C. No hydroxyl group could be detected by infrared analysis of the chromatographically purified derivative.

*Preparation No. 2 of 2,6-di-3,5-dinitrobenxoyloxybenzoic acid (III).*—The procedure of Preparation No. 1 was followed. 51.5 gm. of 3,5-dinitrobenzoyl chloride were suspended in 400 ml. of anhydrous pyridine. The mixture was kept at 30° C. in a cooling bath while 15.2 gm. of anhydrous 2,6-dihydroxybenzoic acid were added in small portions over a period of about 1 hour. After the said acid was all added, the reaction mixture was kept at 50° C. for 24 hours. The procedure of Preparation No. 1 was followed, yielding 16 gm. of yellow-brown crystals melting at 201° C. to 203° C.

*Preparation No. 3 of 2,4,6-tris-trichloroacetoxybenzoic acid (IV).*—3.6 gm. of a commercial grade of 2,4,6-trihydroxybenzoic acid were dissolved in anhydrous pyridine (100 ml.) using a round-bottom 3-neck flask of 300 ml. capacity fitted with a magnetic stirring bar, a reflux condenser, a drying tube, a thermometer, and a dropping funnel. The mixture was kept in a cooling bath at about 30° C. while 12.9 gm. of trichloroacetyl chloride were added dropwise over a period of about 30 minutes. After the addition of said chloride, the temperature of the reaction mixture was allowed to rise to 50° C. The reaction was kept at this temperature for 24 hours.

Isolation and purification of the 2,4,6-tris-trichloroacetoxybenzoic acid was achieved by the same procedure as described under Preparation No. 1. 2.5 gm. of light brown crystals of purified tris-trichloroacetoxybenzoic acid were isolated, M.P. 179° C. to 182° C.

*Preparation No. 4 of 2,6-di-trichloroacetoxybenzoic acid (V).*—A 15.4 gm. sample of anhydrous 2,6-dihydroxy benzoic acid was dissolved at 30° C. in 400 ml. of anhydrous pyridine. The mixture was kept at 30° C. in a cooling bath while 41.5 gm. of trichloroacetyl chloride were added dropwise over a period of about 40 minutes. After the said chloride addition, the temperature of the reaction mixture was raised to 50° C. where it was kept for 24 hours.

Using the same technique as above described, 8.5 gm. of pale brown crystals of the acid were isolated, having a melting point of 126° C. to 129° C.

*Preparation No. 5 of 2,6-di-trifluoroacetoxybenzoic acid (VI).*—A 15.5 gm. sample of commercial grade 2,6-dihydroxybenzoic acid was dissolved in anhydrous pyridine (400 ml.) in a 500 ml. 3-neck round-bottom flask. The flask was fitted with a magnetic stirring bar, a thermometer, a reflux condenser with a drying tube, and an inlet glass tube which protruded to the bottom of the flask below the surface of the pyridine solution. The inlet tubing was attached to a cylinder containing trifluoroacetyl chloride gas. The cylinder was weighed before the commencement of the preparation. The contents of the flask were cooled to 0° to 5° C., and then 30.8 gm. of said gas were slowly bubbled into the reaction mixture. The temperature was maintained at 0° to 5° C. throughout the addition of the gas. After 2.5 hours, the required amount of the gas was introduced. The reaction was kept at 0° to 5° C. for 2 hours after addition of the gas. The temperature was then raised gradually to 40° C. The reaction mixture was kept at this temperature for 20 hours. The thick brown mass was diluted with excess pyridine, and the product was isolated by pouring the mixture into cold water (1.4 liters). The solid was filtered, washed thoroughly with cold water, and air dried.

Preliminary coupling tests with fast-reacting diazo compounds showed some background color, which was interpreted to be caused by coupling due to incomplete substitution on the hydroxy groups of dihydroxybenzoic acid. Because of this observation, the acylation procedure with trifluoroacetyl chloride was repeated on the material isolated as described above, in exactly the same manner described above. The final isolation yielded 10 gm. of crude reaction product. Examination of the crude product by infrared spectroscopy indicated no hydroxyl groups.

A sample of the trifluoroacetoxy derivative (1 gm.) was dissolved in 8 ml. of a mixture of 25% methanol in dioxane. The solution was chromatographed on a column of silica gel (89 gm.), using first a solution of 40% benzene in dioxane, then 100% dioxane, and finally, 100% methanol as eluants. The trifluoroacetoxy derivative was eluted with dioxane. After evaporation of dioxane, a pale brown crystalline solid (0.78 gm.) M.P. 173° C. to 178° C. was isolated. Infrared analysis showed no hydroxy groups.

The invention is not limited to use of the coupler precursors specifically disclosed above. Other derivatives of benzoic acid also function, both mononuclear and polynuclear carboxylic compounds.

In the cofiled applications of Furch and Krueger, Ser. No. 296,113 and Ser. No. 296,114, there are disclosed numerous thermally decarboxylatable precursors, which are hydroxy derivatives of benzoic acid. The nucleus having the carboxy group also has substituents including one or more substituents selected from the group consisting of —OH, —Br, —Cl and lower alkyl groups represented by —$C_xH_{2x+1}$, aryloxy and acyloxy, and essentially containing at least one —OH group. In the polynuclear compounds, the nucleus lacking the carboxylic group may be devoid of substituents, or may have one or more substituents.

The kind and location of substituents in the coupling compounds of the prior art predetermines the stability of the compound against coupling in the presence of a suitable diazonium salt in a selected environment, and the ability to couple on changing the environment, commonly from acidic to alkaline.

The coupler precursors of said Furch and Krueger cofiled applications are those which do not couple in an environment which is selected to avoid coupling at normal temperatures, but to effect coupling at elevated temperatures at which the precursor is decarboxylated.

Among the combinations which couple by thermally decarboxylating the precursors thereof in an acid environment, which do not couple at temperatures below 60° C. there are combinations which will couple if the environment is changed to alkaline. Those compounds which couple in an alkaline environment, are known generally as "couplers" and are herein referred to as "normal" couplers. Therefore, the compounds of said Furch and Krueger cofiled applications which are capable of thermal decarboxylation to effect coupling in an environment in which they are incapable of coupling at normal room temperature, include normal couplers and normal non-couplers, and all are comprehended herein within the term coupler precursor.

For the sake of brevity in giving the following examples, a fixed procedure has been adopted in which the examples differ only in the precursor employed.

*Procedure.*—Paper is coated with a polyvinyl acetate emulsion and dried as a base for the agents employed. An alcoholic solution of the precursor is applied to the coated paper and the alcohol evaporated. Then, there is applied an aqueous sensitizing diazonium composition, which is dried at a temperature not exceeding 60° C. No color is formed in so drying. Then, the paper is subjected to actinic light under a patterned transparency in the normal manner for diazo prints to provide a developable image of the pattern. The light destroys the diazonium compound in the sensitized layer, leaving undecomposed sensitized material in the unexposed areas. The light-printed sheet is then heated to a temperature in the range from 130° to 150° C. for 5 to 10 seconds, thus effecting a colored image as described.

*Sizing composition*

Polyvinyl acetate emulsion (30% solids)

*Precursor solution*

| | | |
|---|---|---|
| Precursor | gram | 1 |
| Methanol | ml | 100 |

*Sensitizing composition*

| | | |
|---|---|---|
| Water | ml | 90 |
| p-Diazo diethylaniline zinc chloride double salt | gram | 1 |
| Tartaric acid | do | 1 |
| Polyvinyl acetate emulsion (45% solids) | ml | 10 |
| Saponin | gram | 0.1 |

The conditions and results are tabulated in TABLE IV designating the precursor by a compound number. The table gives the color developed by decarboxylation. Following the table, the names of the precursors are given with the method of production where it is deemed advisable to enable others to produce the precursor.

TABLE IV

| Example | Precursor No.[1] | ° C. | Seconds | Color |
|---|---|---|---|---|
| 26 | XIII | 130 | 5 | Dense blue. |
| 27 | XIV | 150 | 5 | Dense blue-black. |
| 28 | XV | 150 | 5 | Do. |
| 29 | XVI | 150 | 7 | Blue-black. |
| 30 | XVII | 140 | 8 | Do. |
| 31 | XVIII | 140 | 5 | Sky blue. |
| 32 | XIX | 150 | 7 | Do. |
| 33 | XX | 150 | 6 | Blue. |
| 34 | XXI | 150 | 10 | Yellow-orange. |
| 35 | XXII | 140 | 6 | Blue-black. |
| 36 | XXIII | 150 | 7 | Peach. |
| 37 | XXIV | 150 | 6 | Blue. |
| 38 | XXV | 150 | 6 | Black. |

[1] This number is the same as in Serial No. 296,113.

COMPOUND NAMES AND PREPARATIONS

*Precursor XIII (Example 26)*

Phloroglucinol carboxylic acid was prepared according to Piazza in "Zeitschrift für Physikalische Chemie," vol. 93 (1919) p. 185. It is a known coupler, and when made alkaline as with moist ammonia gas, gives a tan color.

*Precursor XIV (Example 27)*

3,5-dibromo phloroglucinol carboxylic acid was prepared as follows: 170 gm. of phloroglucinol carboxylic acid (XIII) was suspended in 2,000 ml. of glacial acetic acid at 20° C. To this was added over a one-hour period a solution of 325 gm. of bromine in 650 ml. of glacial acetic acid with stirring. The temperature was kept below 30° C. by cooling as required. The product was filtered, washed with glacial acetic acid, then with chloroform, and then dried. Yield: 258 gm. or 79%.

A sample recrystallized from solution in methanol by the addition of chloroform and chilling was analyzed for C, H and Br, and found to correspond to $C_7H_4O_5Br_7$.

Percent found: C, 25.96; H, 1.22; Br, 48.74. Percent theory: C, 25.64; H, 1.22; Br, 48.68.

The melting point is 186° C. to 192° C. with gas evolution dependent on the rate of heating. This compound has been postulated but efforts to produce it have been without success (Monatshefte der Chemie, vol. 32, p. 77). Therefore, it was not heretofore known as a compound or as a coupler.

*Precursor XV (Example 28)*

3,5-dichloro phloroglucinol carboxylic acid was made as follows: 34 gm. of anhydrous phloroglucinol carboxylic acid (XIII) was suspended in 200 ml. of glacial acetic acid in a flask equipped with a reflux condenser, sealed stirrer and gas inlet tube. 28.5 gm. of chlorine was slowly metered in over a one-hour period, with cooling as necessary to keep the temperature below 25° C. On cooling to 16° C., the solid content was filtered off and lightly washed with glacial acetic acid, and dried. On melting the compound gas was evolved. The compound is new.

*Precursor XVI (Example 29)*

The compound is believed to be x-acetoxy-y,6-dihydroxy-3,5-dibromo benzoic acid, wherein x and y are distributed between the 2 and 4 positions, as a result of the following method of preparation:

5 gm. of 3,5-dibromo-2,4,6-trihydroxy benzoic acid (XIV) were dissolved in 40 ml. of acetic anhydride at 50° C. Upon heating to a temperature in the range 60° to 65° C., a precipitate formed, which was filtered off, washed with chloroform and dried. Yield was 2.5 grams, melting at 192°–195° C. with gas evolution. The compound was recrystallized from warm methanol and had a melting point of 192° C. with gas evolution. It is a new compound. The compound was analyzed for carbon and hydrogen with results as follows:

Percent found: C, 29.70; H, 1.69. Percent theory: C, 29.12; H, 1.64.

*Precursor XVII (Example 30)*

4-benzoyloxy-2,6-dihydroxy benzoic acid. The compound was made according to the method of E. Fisher, "Liebig's Annalen der Chemie," vol. 371, p. 307. The compound may be expected to be a coupler.

*Precursor XVIII (Example 31)*

3,5-dibromo-4-benzoyloxy-2,6-dihydroxy benzoic acid was made as follows: 27.5 gm. of precursor XVII (Example 30) in 200 ml. of glacial acetic acid treated with 29.2 gm. of bromine in 60 ml. of glacial acetic acid. The temperature rose from 20° to 30° C., and a precipitate formed, which was filtered off, washed with chloroform and dried. It melted at 180° to 188° C. with gas evolution. The compound is new.

*Precursor XIX (Example 32)*

2,4,6,3',5'-pentahydroxy-3-carboxy-diphenyl. 9 gm. of phloroglucid (the above formula with —H in place of —COOH) was dissolved in 200 ml. of water and heated to 85° C. 20 gm. of sodium bicarbonate were added carefully, and the solution cooled to 50° C. The mass was filtered and the filtrate treated with 50 ml. of concentrated hydrochloric acid (36.5% by weight). The resulting precipitated product was filtered, washed with ice water and dried. It exhibited no melting point on heating, but charred and formed Pharaoh's serpents and sparks. The compound is new.

*Precursor XX (Example 33)*

5,2',4',6' - tetrabromo - 2,4,6,3',5' - pentahydroxy - 3-carboxy diphenyl was made as follows: 13.25 gm. of compound XIX of Example 32 was suspended in 100 ml. of glacial acetic acid. To this was added 32 gm. of bromine dissolved in 64 ml. of glacial acetic acid. As bromination progressed, dissolution progressed. The product was isolated by evaporating the acetic acid at room temperature. It evolves gas on melting. The compound is new.

*Precursor XXI (Example 34)*

2,6-dibromo gallic acid was prepared according to Grimaux, "Comptes Rendus de l'Acadamie des Sciences," vol. 64, p. 977. The compound is known but it not expected to be a coupler.

*Precursor XXII (Example 35)*

3,5-dibromo gamma resorcylic acid was made by the procedure given in Example 2, using one gram mole of gamma resorcyclic acid in place of phloroglucinol carboxylic acid. The compound is known but not expected to be a coupler.

*Precursor XXIII (Example 36)*

2-hydroxy-1-napthoic acid is a known coupler.

*Precursor XXIV (Example 37)*

Methyl phloroglucinol carboxylic acid was made by the method of Schreier and Wenzel, "Monatshefte für Chemie," vol. 25, p. 312. The compound is known and is expected to be a coupler. The methyl group can be changed to other lower alkyl radicals, such as ethyl, propyl, butyl, isobutyl, sec-butyl, tert-butyl, pentyl, iso-pentyl, tert-pentyl, neopentyl, hexyl, isohexyl, etc., represented by —$C_xH_{2x+1}$.

*Precursor XXV (Example 38)*

5-bromo-3-methyl-phloroglucinol carboxylic acid was made by the method of Schreier and Wenzel, "Monatshefte für Chemie," vol. 25, p. 314. The compound is known, but not expected to be a coupler. The methyl group can be changed to ethyl or propyl or other lower alkyl represented by —$C_xH_{2x+1}$.

The precursors of Examples 26 to 38 are all ring-substituted benzoic acids. They are distinguished from those of Examples 1 to 25 by the presence of at least one —OH group. The presence of one or more —OH groups leads to colors more intense than those derivatives lacking in —OH groups and otherwise lacking in other chromophores, such as the nitro group, when coupled by thermal decarboxylation.

The invention is not limited to the diazonium compounds used in the above examples. Other ones function in coupling by thermal decarboxylation. The precursors of Examples 26–28, 30, 31, 34, 35 and 37 have been used in the same procedure with the following diazo compounds substituted, as zinc chloride double salts, or as sulfate or as chloride.

As double salts:
    p-diazo-N,N-dimethyl aniline
    p-diazo-N-methyl-N-beta-hydroxy ethyl aniline
    p-diazo-N-ethyl-N-beta-hydroxy ethyl aniline
    p-diazo-N-ethyl-N-benzyl aniline
    p-diazo-N-methyl-N-benzyl-o-anisidine
    p-diazo-morpholino benzene
    p-diazo-o-chloro-N,N-diethyl aniline
    p-diazo-N-ethyl-o-toluidine
    p-diazo-N,N-diethyl-m-toluidine
    p-diazo-N,N-diethyl-m-phenetidine
    p-diazo-N,N-diethyl-m-carboxy aniline
    p-diazo-2,5-diethoxy morpholino benzene
    p-diazo-2,5-dibutoxy morpholino benzene
    p-diazo-N-benzoyl-2,5-diethoxy aniline
    p-diazo-N-benzoyl-2,5-dibutoxy aniline
    p-diazo-2,5-dimethoxy-p-tolyl mercapto benzene As the sulfate:
    p-diazo-diphenylamine As the chloride:
    p-diazo-2,5,4'-triethoxy diphenyl All produced colors by thermal decarboxylation.

In view of the foregoing description and explanation it is to be understood that the invention is not limited to illustrative examples and that numerous other combinations and compounds are contemplated as falling within the scope of the invention as expressed in the appended claims.

We claim:

1. The method which comprises heating to a decarboxylating temperature a normally stable acidic composition having an intimate contact as a starting material a diazonium compound and an aromatic coupler precursor therefor which contains a carboxylic acid group subject to decarboxylation when heated, said precursor being normally stable in said composition and incapable of coupling with said diazonium compound in said composition, said precursor being subject when heated in the presence of said diazonium compound to decompose and form a transitory material which simultaneously couples with said diazonium compound at the site of decarboxylation.

2. The method which comprises heating to a decarboxylating temperature a normally stable acidic composition having in intimate contact as a starting material an aromatic coupler precursor and a diazonium compound, said precursor being a ring-substituted benzoic acid normally incapable of coupling with said diazonium compound in said composition, and thereby forming a dye by coupling the diazo group of said compound with a transitory material resulting from decarboxylation of said precursor at the site of decarboxylation.

3. The method of claim 2 in which said substituted benzoic acid has but two substituents in the ring.

4. The method of claim 2 in which said substituted benzoic acid has but three substituents in the ring.

5. The method of claim 2 in which said substituted benzoic acid has but two identical substituents in the ring.

6. The method of claim 2 in which said substituted benzoic acid has but three identical substituents in the ring.

7. The method of claim 2 in which said substituted benzoic acid has but three substitutents in the ring including but two identical ones.

8. The method according to claim 2 in which the diazonium compound is light-sensitive.

9. The method which comprises forming on a carrier base a normally stable acidic composition having in intimate contact as a starting material a diazonium compound and a decarboxylatable aromatic coupler precursor having a carboxylic acid group which precursor is incapable of coupling in said composition with said diazonium compound, and heating said composition to a decarboxylating temperature, whereby to decarboxylate said carboxylic acid group in the presence of said diazonium compound and thereby effecting dye-forming coupling of said diazonium compound with a transistory material resulting from decarboxylation of said coupler precursor at the site of decarboxylation.

10. The method according to claim 9 in which the diazonium compound is light-sensitive.

11. The method which comprises heating to a decarboxylating temperature a normally stable acidic composition having in intimate contact as a starting material an aromatic coupler precursor and a diazonium compound, said precursor being a ring-substituted benzoic acid having from two to three substituents and in which each substituent is a selection from the group consisting of —NO$_2$, —Cl, —Br, —O—CO—C$_6$H$_3$(NO$_2$)$_2$ and —O—CO—CX$_3$ wherein X is a halogen, which precursor is normally stable in said composition and incapable of coupling with said diazonium compound in said composition, and thereby decarboxylating said precursor and forming a dye by coupling the diazo group of said compound with a transistory material resulting from decarboxylation of said precursor at the site of decarboxylation.

12. The method which comprises heating to a decarboxylating temperature a normally stable acidic composition having in intimate contact as a starting material a diazonium compound and an aromatic coupler precursor therefor which is 2,4-6-trinitrobenzoic acid of which the carboxylic acid group is subject to decarboxylation when heated, and thereby decarboxylating said precursor, said precursor being normally stable in said composition and incapable of coupling with said diazonium compound in said composition, said precursor being subject when heated in the presence of said diazonium compound to decompose and form a transitory material which simultaneously couples with said diazonium compound at the site of decarboxylation.

13. The method of claim 12 in which the diazonium compound is light-sensitive.

14. A light-sentitive diazotype comprising a carrier base, and on said base a mixture having in close association a coupler precursor which is 2,4,6-trinitrobenzoic acid, and a light-sensitive diazonium compound.

References Cited

UNITED STATES PATENTS

| 2,536,398 | 1/1951 | Slifkin | 96—91 |
| 2,709,655 | 5/1955 | Frederick | 96—75 |
| 2,780,547 | 2/1957 | Ferzola et al. | 90—75 |
| 2,807,545 | 9/1957 | Frederick | 96—75 |
| 3,052,542 | 9/1962 | Sulich | 96—91 |
| 3,122,410 | 2/1964 | Mueller et al. | 8—41 |
| 3,206,454 | 9/1965 | Merian et al. | 260—205 |

FOREIGN PATENTS

| 3,140,180 | 7/1964 | Germany. |
| 3,186,845 | 7/1965 | Germany. |

OTHER REFERENCES

Venkataroman, K., The Chemistry of Synthetic Dyes, vol. I, Academic Press Inc., 1952, N.Y., TP913V4C.2, (pp. 433 and 438–440).

NORMAN G. TORCHIN, *Primary Examiner.*

ALEXANDER D. ROCCI, *Examiner.*

C. L. BOWERS, JR., *Assistant Examiner.*